(12) United States Patent
Kuehn et al.

(10) Patent No.: US 8,841,037 B2
(45) Date of Patent: Sep. 23, 2014

(54) FUEL CELL SYSTEM WITH BURNER

(75) Inventors: Sascha Kuehn, Dresden (DE); Katrin Klein, Dresden (DE); Gerhard Matthias Buchinger, Wels (AT)

(73) Assignee: Ezelleron GmbH, Dresden (DE)

(*) Notice: Subject to any disclaimer, the term of this patent is extended or adjusted under 35 U.S.C. 154(b) by 446 days.

(21) Appl. No.: 12/998,882

(22) PCT Filed: Dec. 14, 2009

(86) PCT No.: PCT/EP2009/008953
§ 371 (c)(1),
(2), (4) Date: Aug. 11, 2011

(87) PCT Pub. No.: WO2010/066466
PCT Pub. Date: Jun. 17, 2010

(65) Prior Publication Data
US 2011/0294022 A1    Dec. 1, 2011

(30) Foreign Application Priority Data

Dec. 12, 2008  (DE) .......... 10 2008 064 029

(51) Int. Cl.
| | |
|---|---|
| H01M 8/06 | (2006.01) |
| H01M 8/00 | (2006.01) |
| H01M 8/04 | (2006.01) |
| H01M 8/10 | (2006.01) |
| H01M 8/12 | (2006.01) |
| H01M 8/24 | (2006.01) |
| H01M 8/02 | (2006.01) |

(52) U.S. Cl.
CPC ...... *H01M 8/004* (2013.01); H01M 2008/1095 (2013.01); H01M 8/1246 (2013.01); H01M 2250/30 (2013.01); *H01M 8/04052* (2013.01); H01M 8/249 (2013.01); Y02B 90/18 (2013.01); *H01M 8/04074* (2013.01); H01M 8/04753 (2013.01); Y02E 60/50 (2013.01); H01M 2008/1293 (2013.01); H01M 8/0276 (2013.01); Y02B 90/16 (2013.01); H01M 2250/405 (2013.01); *H01M 8/243* (2013.01); Y02E 60/525 (2013.01); *H10M 8/04022* (2013.01)
USPC ............ 429/408; 429/433; 429/434; 429/436

(58) Field of Classification Search
USPC .................................. 429/408, 433, 434, 436
See application file for complete search history.

(56) References Cited

U.S. PATENT DOCUMENTS

| | | | |
|---|---|---|---|
| 5,244,752 A | 9/1993 | Zymboly | 429/31 |
| 2004/0157096 A1 | 8/2004 | Peterson | 429/13 |
| 2007/0111064 A1 | 5/2007 | Haile et al. | 429/26 |
| 2007/0243444 A1* | 10/2007 | Zheng et al. | 429/31 |

FOREIGN PATENT DOCUMENTS

| | | |
|---|---|---|
| EP | 1309027 | 5/2003 |
| EP | 1703576 | 9/2006 |
| WO | 2005038973 | 4/2005 |
| WO | 2005078842 | 8/2005 |
| WO | 2006116638 | 11/2006 |

* cited by examiner

*Primary Examiner* — Jane Rhee
(74) *Attorney, Agent, or Firm* — Jacobson Holman, PLLC (57) ABSTRACT

Fuel cell system with at least one burner that is arranged directly at a fuel cell, shaped at/on it, or in which a burner (7) is a separate element of a fuel cell system with more than one fuel cell (8) and this burner possesses the structure of a fuel cell or of a sealing element (5) of a fuel cell.

21 Claims, 8 Drawing Sheets

FUEL CELL SYSTEM WITH BURNER

This is a national stage of PCT/EP09/008,953 filed Dec. 14, 2009 and published in English, which claims the priority of German number 10 2008 064 029.8 filed Dec. 12, 2008, hereby incorporated by reference.

The invention relates to a fuel cell system with one or more burners.

BACKGROUND OF THE INVENTION

A problem of high temperature fuel cell systems for small power classes is that as a result of the low in-system heat production, it is difficult to realise the high work temperatures (several 100° C.) needed for operation. Potential solutions can be considered with the installation of burners. However, efficiency reasons must be considered here. At the same time a space-saving structure must be implemented for mobile and portable systems.

Fuel cells are tertiary galvanic elements that have been known for some time. Among the various fuel cell types, the solid oxide fuel cells occupy an outstanding position due to the fact that they have the highest fuel flexibility. Because of the high work temperature that generally exceeds 600° C., thermal losses are however of critical importance, especially with small systems. This is also the reason why the majority of the SOFC applications is not designed for small mobile or portable systems (Fuel Cell Handbook 7th edition, EG&G Services, Inc. U.S. Department of Energy, Office of Fossil Energy, National Energy Technology Laboratory, Morgantown, West Va., November 2004; Handbook of Fuel Cells Fundamentals, Technology and Application, Wolf Vielstich, Hubert A. Gasteiger, Arnold Lamm, 2003 John Wiley & Sons, Ltd.).

Among the solid oxide fuel cells (SOFCs) the microtubular designs are particularly stable against variations in temperature (V. Lawlor, S. Griesser, G. Buchinger, A. Olabi, S. Cordiner, D. Meissner—Review of the micro-tubular solid oxide fuel cell (part I: Stack design issues and research activities)—Journal of Power Sources, 2009, pp. 387-399.).

The task of the invention is to secure improved utilisation and stable operation of fuel cells—especially microtubular solid oxide fuel cells—also in the case of variations in temperature and temperature gradients occurring during operation, and also to provide a system that is as compact as possible, especially for mobile and portable applications.

This task is solved in accordance with the invention by a fuel cell system that has the features claimed herein.

The individual characteristics of the design examples, which are described in the following, can be realized independently from each other within the framework of the present invention, thus do not have to be exactly implemented in the characteristic combinations presented in the examples.

The invention enables direct warming of in particular microtubular fuel cells because of convection, radiation and in particular thermal conduction.

The special stability of the microtubular SOFCs against temperature gradients can be used to solve this problem.

In a fuel cell system in accordance with the invention at least one burner is directly arranged at a fuel cell and/or one burner is a separate element of a fuel cell system with several fuel cells.

There can be at least one microtubular SOFC in a system in accordance with the invention whereby one or more burners are located in the direct vicinity of a fuel cell.

One or more burners can be executed directly as an integral part of one or more fuel cells.

One or more burners can be present directly as an integral element of one or more fuel cells, whereby this/these can be integrated as part of a sealing concept for separating the gas chambers between an atmosphere with oxidizable gas and an atmosphere with reducible gas. The gas chambers are separated in such a way that a partial gas exchange between oxidizable and reducible gas can take place that leads to a desired exothermic chemical reaction and thus to warming or heating up.

To form the burner at least one aperture in the layer of a gas-tight electrolyte can exist or be formed/attached there. An electrolyte can also be completely or partially open porous so that in both cases gas exchange and consequently an exothermic reaction can be achieved.

This/these aperture(s) can be present already in the manufacturing process of the electrolyte layer or be formed during this. At least one aperture can also be inserted after the electrolyte layer has already been produced. This also applies for porous areas. Apertures of the electrolyte can be formed, for example by application (brushing, printing, spraying of a layer of an organic material such as e.g. waxes at the positions that are subsequently to display a aperture or porosity. After application of these organic layers the actual material forming the electrolyte can be applied (e.g. dip coating, electrophoretic deposition, spraying, splattering, plasma coating, slip casting . . . ). After this a sintering can be carried out, whereby at least one aperture or increased porosity is formed as a result of the burnout of the organic layer. It is possible to proceed by analogy when forming the outer electrode, whereby direct electronically conductive contact between the inner and outer electrodes should be avoided. Alternatively, specifically the electrolyte and the outer electrode can be applied at the desired positions by printing, spraying or other ceramic processes. The porosity can for example be set by adding a pore former, such as e.g. carbon or PMMA, whereby it is also possible to produce a graduated transition of the pore ratio up to a tight electrolyte. The pore ratio or the porosity changes successively there. In a special embodiment sealing materials (e.g. glass solders, ceramic adhesives, metal solders . . . ) can be applied directly next to the positions at which the exothermic reaction through the gas exchange is to take place. These sealing materials should be placed next to the electrolyte or even overlap it in such a way that the electrolyte is not directly arranged in the area heated by the exothermic reaction. The advantage of this arrangement lies in the fact that the electrolyte and possibly also the outer electrode is not directly next to the hottest point (hot-spot), the position at which the targeted combustion of an oxidizable component takes place, so that lower thermal stresses occur at the electrochemically active centres.

Apertures or porous areas can preferably be present only at the ends or only in the middle (possibly as interruptions of an outer electrode coating) of the microtubular SOFCs. They can also be present at the ends and in the middle of the microtubular SOFCs. One or more strip-shaped apertures or porous areas can run along the cell axis or at an angle of 0 to 179° to the cell axis along a part of the cell area usually covered by electrolytes or other approximately gas-tight material. Combinations of such patterns of deliberately produced gas leakiness between at least one reducing and at least one oxidizing atmosphere along the cell or its seals can also be used in the invention.

Those areas of the fuel cells that are not provided with a gas-tight electrolyte layer or directly adjacent to this can consist of another material. Areas of different materials or porosities can for example be produced by a sequential injection moulding method or by joining using (possibly electrically conductive) ceramic adhesives, glasses or metal solders.

Any material customarily used as an ion conductor in the field of the fuel cells—such as e.g. polymer electrolytes—can be used as electrolyte. Materials for solid oxide fuel cells such as e.g. doped zirconium oxides, doped cerium oxides and doped gallates are particularly preferred. Materials or material combinations used in the field of fuel cell research are equally suitable for the electrodes. For the cathodes these are for example noble metals (Pt, Rh, Pd, silver, . . . ), ceramic perovskites (LSM, LSC, LSCF, LSF, . . . ), nickelates and composite electrodes made of cathode material and ion conductors. For the anodes it is possible to use e.g. noble metals (Pt, Rh, . . . ), transition metals (nickel, copper, . . . ) or ceramic compounds such as perovskites, titanates, chromites and niobates.

If the exothermic reaction takes place with oxidizable components at sealing elements, any sealing concepts that are used in the field of fuel cell technology can be used. Examples of this are ceramic adhesives or glasses in which pores are formed selectively by adding pore forming agents, by insufficiently long drying after application or also where appropriate subsequently by mechanical or chemical means. Alternatives as sealing elements are also pressure seals in which the desired gas leakiness can be set by varying the compressive force, it is possible to vary said compressive force depending on the system state (e.g. higher leakiness during heating up, maximum tightness during cooling down). The gas exchange of the gases/gas mixtures used for an exothermic reaction can also be influenced selectively by bringing influence to bear via gap dimensions, perforated sheets or lamellar seals within a partition wall between an oxidizing and a reducing atmosphere in which the cells are embedded.

Not all the cells or seals in a fuel cell system with more than one fuel cell have to function as burners.

Parts functioning as burners can consist of a different material combination than the parts not functioning as burners.

The invention particularly preferably uses microtubular SOFCs that have a diameter of 0.01 mm-20 mm (preferably between 0.5 mm-5 mm) and a length of 1 mm-500 mm (preferably between 10 mm-100 mm). These solid oxide fuel cells can be electrolyte based (ESC), anode based (ASC), cathode based (CSC) and metal based (MSC). ESCs, CSCs and MSCs tend to show enhanced stability to reoxidation of the anode. One of the particularly preferred embodiments is the use of MSCs, as the metal substrate conducts the heat resulting from targeting exothermic reaction well and this consequently leads to fast and as far as possible uniform warming of the cell. In the case of ASCs it is ensured through appropriate flow control that the anode does not oxidize or only oxidizes locally and the gas-tight electrolyte is not damaged. It is also possible to prevent or at least alleviate the danger of cell damage caused by deoxidizing nickel through appropriate modification of the anode structure. Such a modification consists for example in the gradual decrease of the content of oxidizable metal (e.g. nickel) from the middle of the substrate to the surface of the adjacent electrolyte or in the use of a coarse-grained porous oxide framework (preferably an ion conductor such as YSZ) in which the nickel particles were applied by impregnation. An alternative option is the use of anode materials stable to reoxidation such as it is mostly the case with ceramic anode materials, such as e.g. perovskites.

Catalytically active substances such as e.g. noble metals (Pt, Rh, Ru, . . . ) or ceramic oxides (perovskites) can be added to the anodes or to parts of the fuel cells or sealing elements functioning as burners whereby said substances can lead to an initiation of the exothermic reaction already at low temperatures and/or low concentrations of oxidizable substances (hydrogen, carbon monoxide, hydrocarbons, alcohols, ammonium, DME, . . . ) and/or trigger reforming functions too. A possible adding of catalytic substances only at the positions/areas without gas-tight electrolyte can be executed for example by spraying, impregnation, electrochemical deposition, electrophoretic deposition, printing or other customary processes.

The gas supply to the parts functioning as burners can be regulated or controlled separately. The gas supply to one electrode or both electrodes of the fuel cells can be stopped or regulated to cool the system. Thus a gas with enlarged volume flow rate can be fed in so that it is not completely consumed/converted/oxidized in a reaction and a surplus component of this gas that can be fed cold leads to cooling. A non-combustible gas (such as e.g. nitrogen or noble gases) and/or gas or gas mixture with a cooling effect through an endothermic reaction (e.g. hydrocarbons in combination with steam in any mixture) can also completely or only partially replace the originally combustible gas.

For heating up the system the gas supply to the parts functioning as burners can be actuated differently than the gas supply to the parts of a system in accordance with the invention not functioning as burners. For example an increased pressure/flow of oxidizable and/or reducible gas can be applied to the fuel cells or sealing elements for heating up the system, which leads to an increased exothermic reaction that allows faster heating up. On the other hand the flow or pressure can be reduced or even stopped at these positions/areas for cooling the system.

In the scope of this invention it is possible to arrange serial connections of one or more gas flows of cells or sealing elements functioning as burners with other fuel cells or system components (e.g. reformers) of the system and as a result intensive heat exchange is possible between the burner modules and the following components. As a result of this serial connection, fuel (hydrocarbons, alcohols, ammonia, reformate gas, DME, . . . ) reforming is also advantageously possible for the following system parts (cells, reformers, after-burners, . . . ), especially when not the whole fuel is used for burning.

A special, possibly periodic supply or periodic changes in the amount of gas with reducing effect and gas with oxidizing effect can be set for control and to avoid any damage (e.g. reoxidation) to the system.

The quantity supply of at least one gaseous and/or liquid reactant can be used to influence the temperature and/or performance of the system or parts of the system.

Of course the features set out above and those to be explained below can be used not only in the respective combination stated, but also in other combinations or as stand-alone features without leaving the scope of the present invention.

The work temperatures of typically 500° C.-1000° C. required for the operation of solid oxide fuel cells can be maintained simply and safely with the invention, which otherwise cannot be achieved easily for small systems. Heat losses can be considerably reduced or avoided. Mainly in the starting phase of a high temperature fuel cell system, the application of heat can be achieved quickly and efficiently up to the operation of the fuel cells. The application of additional burners as a matter of principle has already long been known from the state of the art (US200710243444; WO2007082522; DE19517425C1; Journal of Power Sources 86 (2000) 376-382). However, these publications in no place mention direct use of a fuel cell or a fuel cell seal as burner. The invention makes it possible to generate heat directly close to one or more fuel cells, even directly at the fuel cell or even more directly in the direct vicinity of the reactive centres of one or more fuel cells. As a result an ideal heat transfer from the exothermic reaction to the reactive areas can be achieved, which in turn reduces the fuel required for heat generation and can even lead to a decrease of the thermal insulation complexity. As a result of this property, in particular small SOFC systems can be operated efficiently. Through the combination of a fuel cell that at the same time can function as a burner there is an exceptional possibility to reduce system size, material and production costs.

BRIEF DESCRIPTION OF THE DRAWINGS

The invention is explained below with the aid of examples. The following are shown in the figures.

DETAILED DESCRIPTION OF THE PREFERRED EMBODIMENTS

Figure 1:
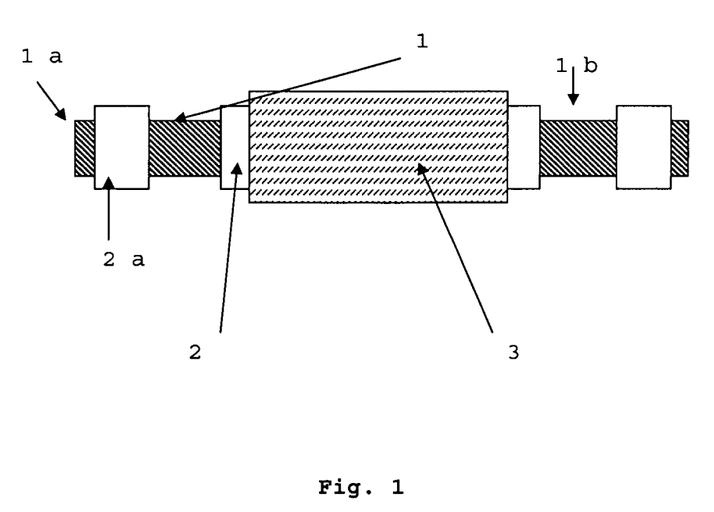
FIG. 1 An example that can be used in the invention of a microtubular SOFC that is constructed as an integrated burner.

FIG. 1 shows a microtubular SOFC that can function as an integrated burner for heat production. In this cell the inner electrode 1 is largely surrounded by an electrolyte 2, that in turn is largely surrounded by the outer electrode 3. When installed in the fuel cell system, the cell is sealed at the transition between the separate electrolyte sections 2a at the sides and the outer edges of the inner electrode 1a. The targeted oxidation that is not electrochemically caused (e.g. direct conversion of fuel with atmospheric oxygen as oxidation/combustion) of parts of the fuel flowing/streaming inside or outside the cell takes place at the areas 1b, at which the inner electrode 1 is not coated with an electrolyte 2, and contact between the reducing and oxidizing atmospheres thus takes place. At least one aperture or a porous area can be present there. The inner electrode 1 and the outer electrode 3 are made of different materials and depending on the concrete type of a tubular high temperature fuel cell can thus be a cathode or anode respectively.

Figure 2:
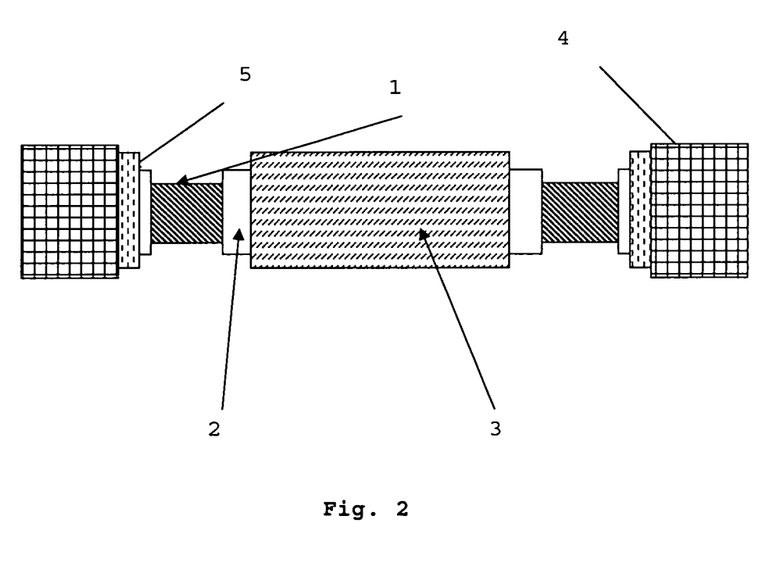
FIG. 2 A further example of a microtubular SOFC that can be used in the invention that is constructed as an integrated burner.

In the example in accordance with FIG. 2 with a microtubular SOFC that can function as an integrated burner, the cell is shown in installed condition. The supply of the gas for the inner electrode 1 takes place through the gas supply unit 4 and the desired, not necessarily complete separation of the gas chambers of the inner electrode 1 and the outer electrode 3 takes place through the sealing element 5 that can be partially gas permeable, whereby a targeted chemical reaction/combustion of the fuel for heat production can take place at this sealing element 5.

Figure 3:
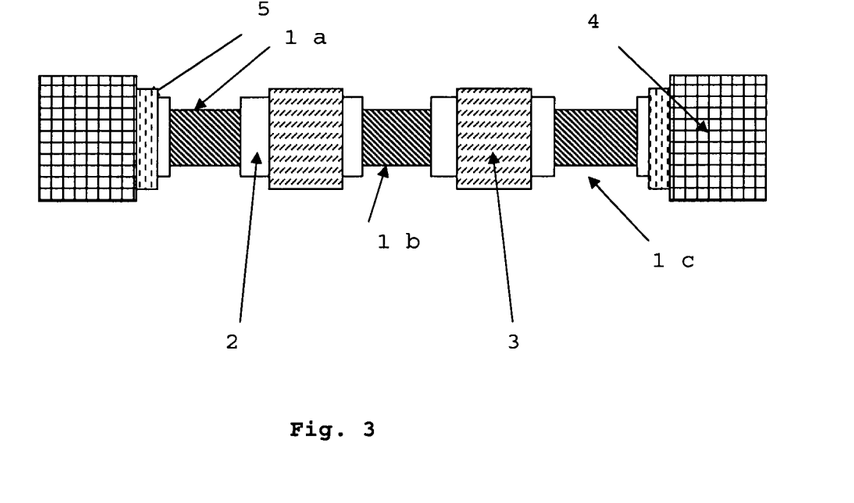
FIG. 3 A microtubular SOFC in which exothermic reactions can proceed in several areas.

With the example in accordance with FIG. 3, a targeted multiple taking place of exothermal reactions is possible along the microtubular SOFC at the areas 1a, 1b and 1c.

Figure 4:
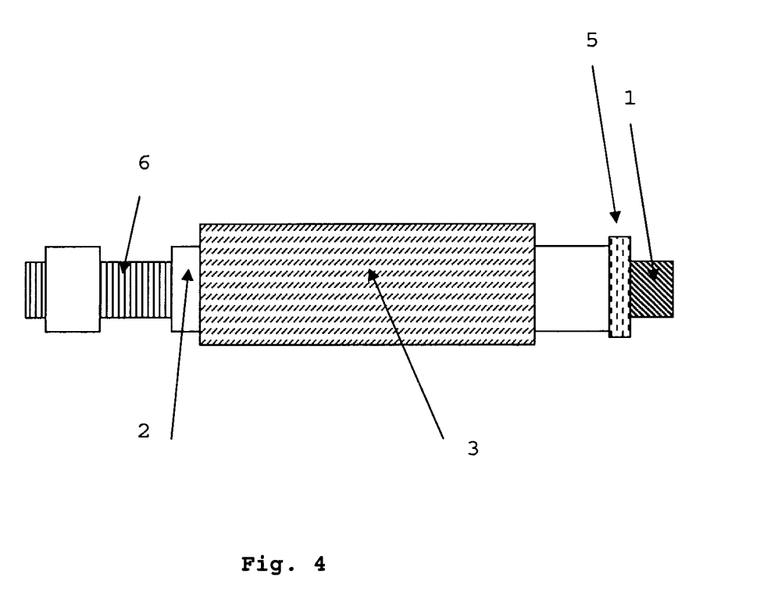
FIG. 4 A microtubular SOFC in which another material or another material combination has been used in areas in which the gas exchange and the exothermic reactions can take place.

In the microtubular SOFC shown in FIG. 4, a different material or a different material combination is used in the areas 6 of the inner electrode 1 at which the gas exchange and the exothermic reactions take place than is used in the areas in which the inner electrode 1 is completely covered by the electrolyte 2 and/or there is no mixing of the atmosphere of the inner electrode 1 and the outer electrode 3 due to sealing elements 5, located between the electrolyte 2 and the gas supply 4.

Figure 5:
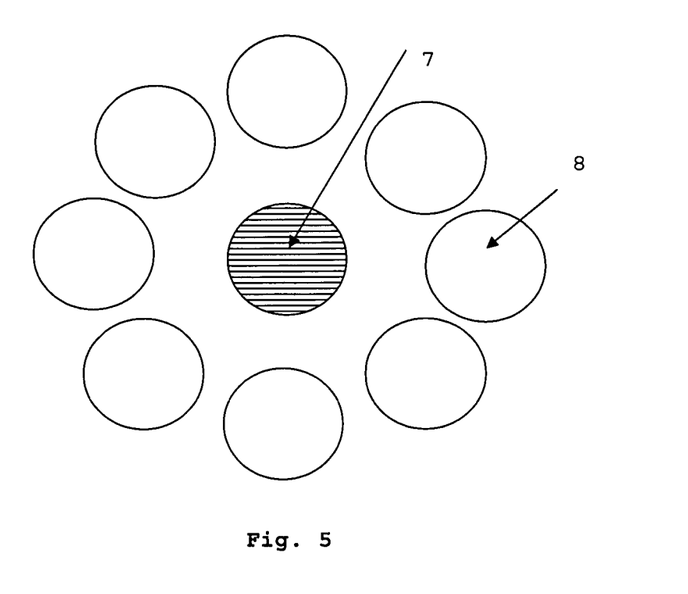
FIG. 5 A fuel cell system with several fuel cells in which one individual cell is constructed as an internal burner.

In the fuel cell system shown in FIG. 5 there is more than one fuel cell, in this example microtubular SOFCs 8. A single cell is present here as internal burner 7 for heating the system and the other fuel cells 8 do not satisfy this function. The cell formed as burner 7 can be used optionally to generate electric current and/or for heating depending on the mode of operation. In the latter case an electrolyte can show apertures or open pores over the entire area.

Figure 6:
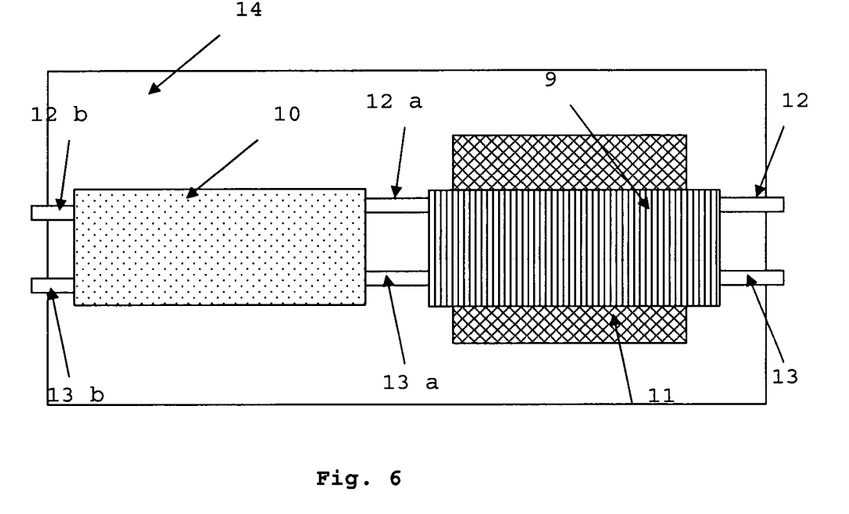
FIG. 6 A fuel cell system with fuel cells functioning as burners and fuel cells with sealing elements functioning as burners that is constructed with two system parts.

In the fuel cell system shown in FIG. 6, the heat use of the fuel cells functioning as burner or fuel cells with sealing elements 5 functioning as burners is shown. In the system part 9 there is at least one fuel cell 7 functioning as burner or a sealing element 5 in accordance with the invention, whereby other system components such as e.g. fuel cells not functioning as burners can also be integrated in system part 9. Oxidizable gas can be fed in through the supply pipe 12 and reducible gas through the supply pipe 13. The exhaust gases from the system part 9 can be passed serially to system part 10 through lines 12a and 13a. The system part 10 here represents a different component of the system that can for example contain fuel cells, reformers and/or after-burners. Through this serial connection intensive heat exchange takes place between system parts 9 and 10 and the conversion of the gases in system part 9 can be set between 0% and 100%. In this embodiment, system part 9 also emits heat indirectly (i.e. without directly piping of the exhaust gases) to a heat absorbing component (e.g. reformer and/or heat exchanger) 11. The system is surrounded by the thermal insulation 14. The heat or exhaust gases produced in system part 10 can also be used further in the overall system too. The conversion in system part 9 (electrochemically, catalytically or because of the deliberately caused oxidation/combustion) can be used as fuel treatment for the system part 10, as a result of which system part 10 can operate under different operating conditions (temperature, . . . ) or with other possibly more cheaper materials. The exhaust gases can be guided out of system part 10 via the pipes 13b and 12b. The pipes 12a and 13a can if appropriate be executed as a combined pipe and be integrated e.g. in an after-burner for anode exhaust gas combustion with cathode exhaust gas present in system part 10.

Figure 7:
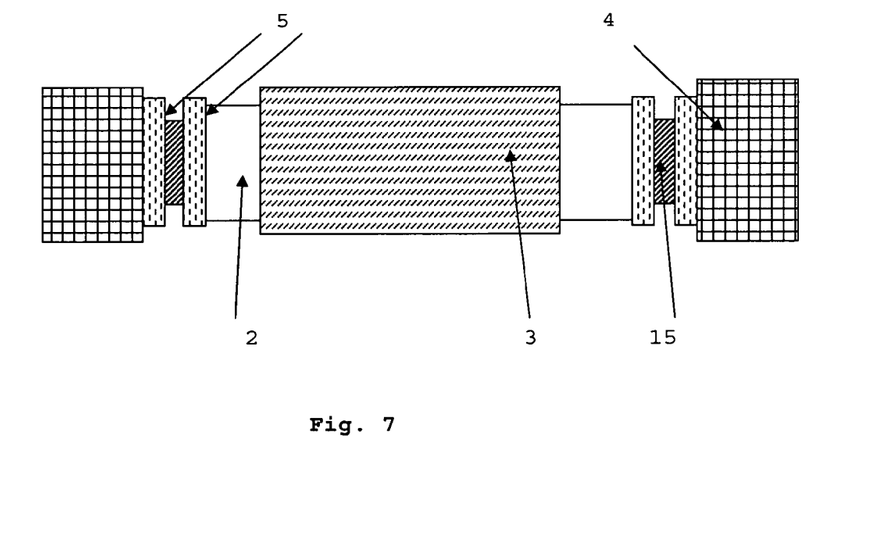
FIG. 7 A microtubular SOFC with additional sealing element.

FIG. 7 shows a tubular SOFC in which an additional sealing element 5 is fitted between electrolyte 2 and the area 15 in which partial oxidation/combustion of the fuel takes place whereby the said sealing element in this case is preferably not gas permeable so that the electrolyte is not located in the direct vicinity of the reaction/oxidation zone and is thus exposed to lower thermal stresses.

Figure 8:
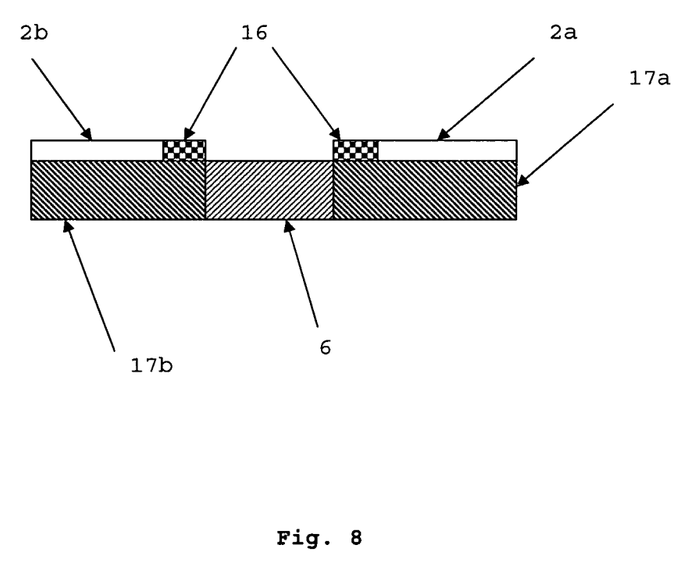
FIG. 8 A section of a microtubular SOFC with an additional coating for protection of the electrolyte.

FIG. 8 shows the schematic structure of a microtubular SOFC in which an area 6 of the inner electrode 1 in the area in which the exothermic reaction takes place is made of a different material than the parts 17a and 17b of the inner electrode 1 that are mostly coated with the electrolyte 2. An additional gas-tight, electrochemical inactive layer 16 is applied adjacently to the place 6 of the exothermic reaction in order to protect the electrolyte 2a and 2b against possible hot spots at the place 6 of the exothermic oxidation/combustion.

However other fuel cells, preferably high temperature fuel cells, can be used in the examples in place of the microtubular SOFCs.

The invention claimed is:

1. Fuel cell system with at least one burner that is arranged directly at a fuel cell, shaped at/on it, or in which a burner (7) is a separate element of a fuel cell system with more than one fuel cell (8) and this burner possesses the structure of a fuel cell or of a sealing element (5) of a fuel cell and wherein at least one aperture in a gas-tight electrolyte (2) formed as a layer and/or at least one porous area of the otherwise gas-tight electrolyte (2) is executed as a burner through which a gas exchange takes place.

2. Fuel cell system in accordance with claim 1, characterised in that the system is formed with at least one microtubular solid oxide fuel cell.

3. Fuel cell system in accordance with claim 1, characterised in that the at least one burner is an integral part of a fuel cell.

4. Fuel cell system in accordance with claim 1, characterised in that one burner is a sealing element (5) or a part of a sealing element (5) that is arranged between gas chambers for an oxidizable gas/steam or gas mixture/steam mixture and a reducible gas/steam or gas mixture/steam mixture, through which a gas exchange of oxidizable and reducible gas takes place.

5. Fuel cell system in accordance with claim 1, characterised in that at least one aperture and/or at least one porous area is arranged through/at a sealing element (5) through which a gas exchange takes place.

6. Fuel cell system in accordance with claim 1, characterised in that at least one aperture or a porous area exists at one end and/or in the middle or as a strip at/on a microtubular solid oxide fuel cell.

7. Fuel cell system in accordance with claim 1, characterised in that there is one or more aperture(s) or a porous area in the middle at/through the gas-tight electrolyte (2) and/or one or more aperture(s) is/are formed on an outer electrode (3), that is formed as a layer.

8. Fuel cell system in accordance with claim 6, characterised in that the aperture(s) on an outer electrode (3) is/are shaped in such a way that there is no direct electrically conductive contact through the apertures of the electrolyte (2) between the inner electrode (1) and the outer electrode (3).

9. Fuel cell system in accordance with claim 1, characterised in that there is a separate controllable or adjustable gas supply to one or more burners (7) and/or parts of the system that function as burner.

10. Fuel cell system in accordance with claim 1, characterised in that the gas supply to at least one of the two electrodes (1, 3) of fuel cells is adjustable or controllable for cooling.

11. Fuel cell system in accordance with claim 1, characterised in that the inner electrode (1) and/or outer electrode (3) comprise catalytic active substances/compounds for oxidation/combustion of the fuel.

12. Fuel cell system in accordance with claim 1, characterized in that fuel cells (7) and/or sealing elements (5) that function as burners are connected in parallel or in series with other system components concerning the gas flow.

13. Fuel cell system in accordance with claim 1, characterised in that the fuel cells (7) or sealing elements (5) acting as burner are arranged in the direct vicinity of a heat exchanging or heat consuming system component.

14. Fuel cell system in accordance with claim 1, characterised in that the fuel cell(s) (7) acting as burner or fuel cells downstream or upstream of this/these fuel cell(s) (7) are polymer electrolyte membrane fuel cells.

15. Fuel cell system with at least one burner that is arranged directly at a fuel cell, shaped at/on it, or in which a burner (7) is a separate element of a fuel cell system with more than one fuel cell (8) and this burner possesses the structure of a fuel cell or of a sealing element (5) of a fuel cell and wherein the inner electrode (1) and/or the electrolyte (2) and/or the outer electrode (3) of a solid oxide fuel cell is/are formed of a different material in areas or directly adjacent to areas in which there is at least one aperture or a porous area at the electrolyte (2), and/or in the areas and/or directly adjacent to areas at which there is an additional gas-sealing layer (16) that is electrochemically inactive than in areas with a gas-tight electrolyte (2).

16. Fuel cell system in accordance with claim 15, characterized in that the electrochemically inactive layer (16) is located adjacent to areas in which exothermic reactions take place as a result of a porous or open-worked sealing element/electrolyte (5, 2.).

17. Fuel cell system in accordance with claim 15, characterised in that the system is formed with at least one microtubular solid oxide fuel cell.

18. Fuel cell system in accordance with claim 15, characterised in that the at least one burner is an integral part of a fuel cell.

19. Fuel cell system in accordance with claim 15, characterised in that one burner is a sealing element (5) or a part of a sealing element (5) that is arranged between gas chambers for an oxidizable gas/steam or gas mixture/steam mixture and a reducible gas/steam or gas mixture/steam mixture, through which a gas exchange of oxidizable and reducible gas takes place.

20. Fuel cell system in accordance with claim 15, characterised in that there is a separate controllable or adjustable gas supply to one or more burners (7) and/or parts of the system that function as burner.

21. Fuel cell system in accordance with claim 15, characterised in that the gas supply to at least one of the two electrodes (1, 3) of fuel cells is adjustable or controllable for cooling.

* * * * *